United States Patent [19]

de la Plaza

[11] 4,275,270
[45] Jun. 23, 1981

[54] SPEECH DETECTOR FOR USE IN AN ADAPTIVE HYBRID CIRCUIT

[75] Inventor: Alejandro de la Plaza, Mountain View, Calif.

[73] Assignee: The Regents of the University of California, Berkeley, Calif.

[21] Appl. No.: 98,623

[22] Filed: Nov. 29, 1979

[51] Int. Cl.³ .............................................. G10L 1/00
[52] U.S. Cl. .................................. 179/1 SC; 179/1 P; 179/170.2
[58] Field of Search .................. 179/1 SC, 1 VC, 1 P, 179/1 HF, 1 H, 1 CN, 170 R, 170 NC, 170.2; 370/102; 375/8; 370/24, 31

[56] References Cited

U.S. PATENT DOCUMENTS

| | | | |
|---|---|---|---|
| Re. 30,111 | 10/1979 | Blood | 179/1 H |
| 3,621,142 | 11/1971 | Bunting | 179/1 H |
| 3,860,768 | 1/1975 | Wehrmann | 179/170.2 |
| 3,878,337 | 4/1975 | Fariello | 179/1 VC |
| 3,909,532 | 9/1975 | Rabiner et al. | 179/1 SC |
| 4,213,014 | 7/1980 | Luder | 179/170.2 |

OTHER PUBLICATIONS

W. Ahern et al., "Speech Signal Power in the Switched Message Network", Bell Syst. Tech. J., Sep. 1978, pp. 2695–2726.

Primary Examiner—Charles E. Atkinson
Assistant Examiner—E. S. Kemeny
Attorney, Agent, or Firm—Flehr, Hohbach, Test, Albritton & Herbert

[57] ABSTRACT

A speech detector for use in an adaptive hybrid circuit is disclosed. The speech detector detects the instantaneous sign of current and voltage in a hybrid circuit and thereby determines the direction of power flow in the circuit. The direction of power flow is indicative of the presence or absence of a near end talker. The hybrid circuit enables or disables adaption based upon the presence or absence of the near end talker in the telephone system.

8 Claims, 8 Drawing Figures

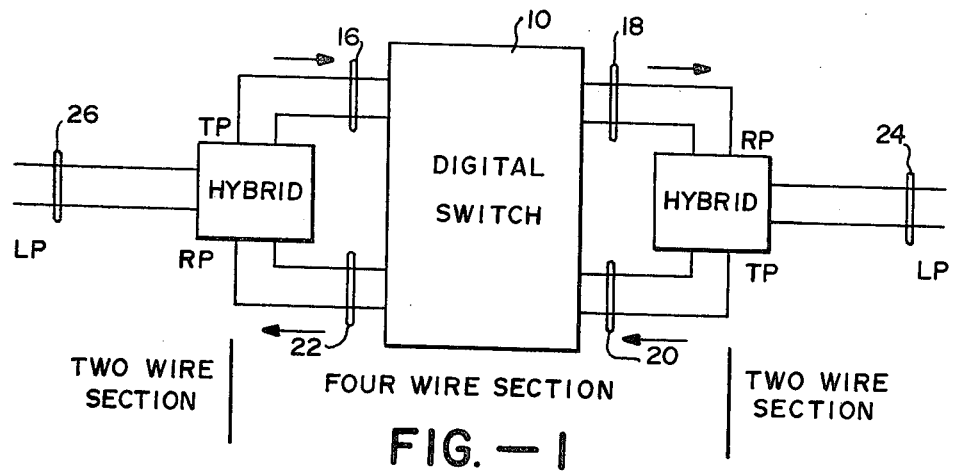
FIG.—1
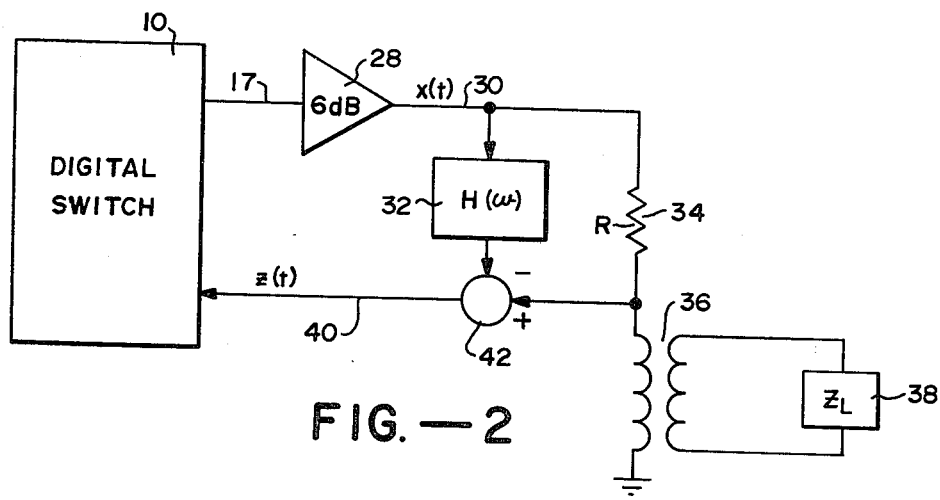
FIG.—2
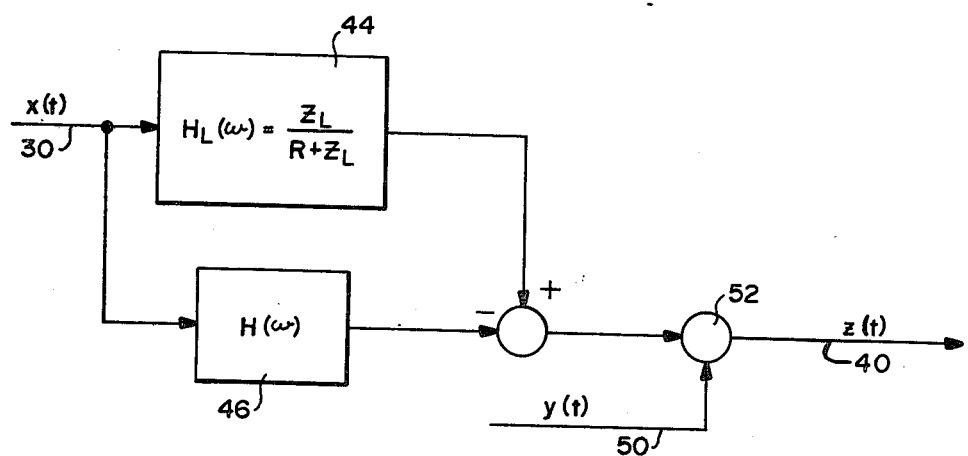
FIG.—3

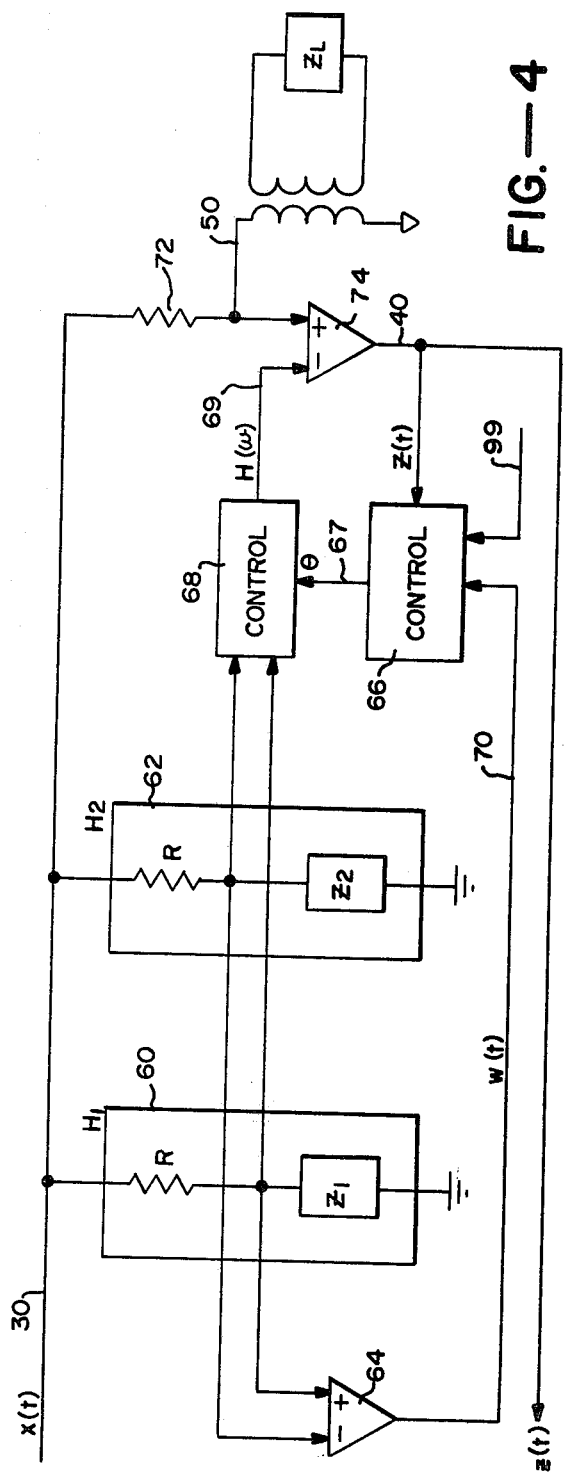
FIG.—4
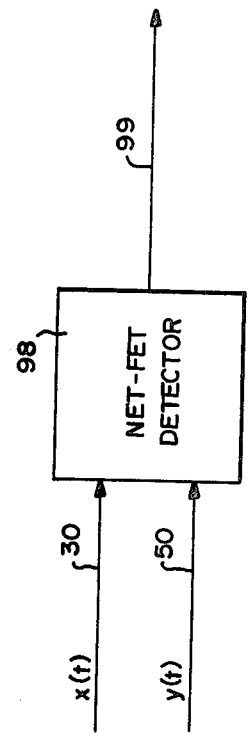
FIG.—5

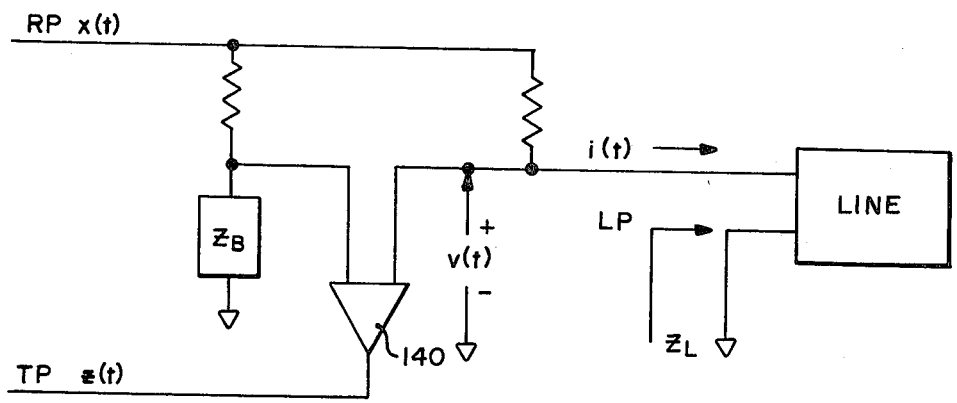
FIG.—6
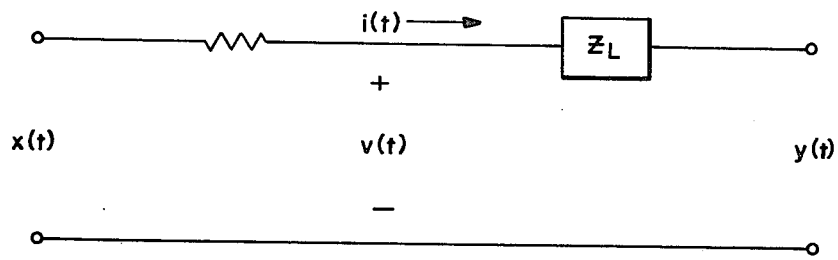
FIG.—7
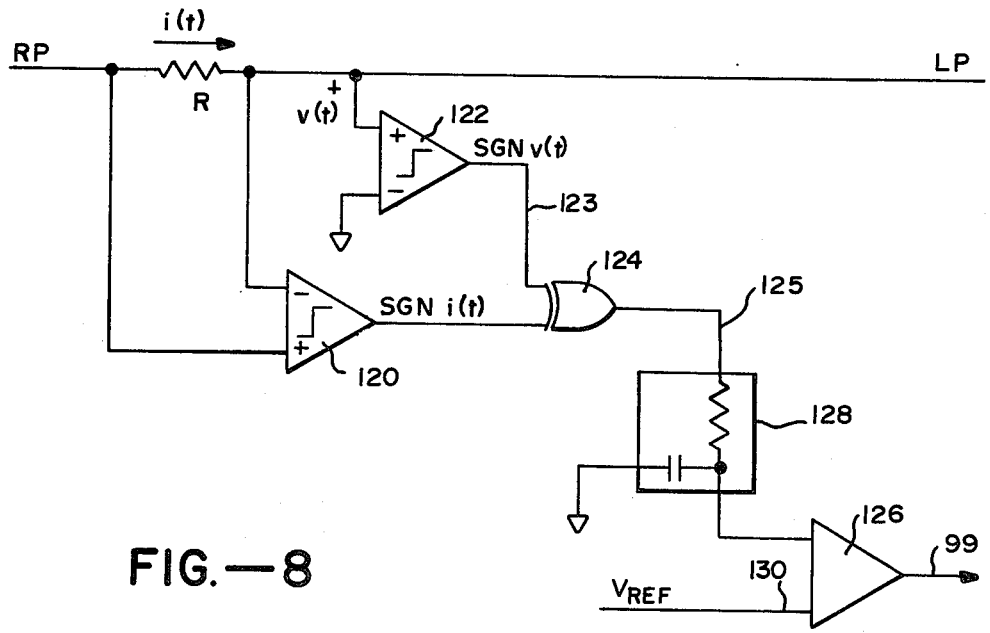
FIG.—8

SPEECH DETECTOR FOR USE IN AN ADAPTIVE HYBRID CIRCUIT

CROSS-REFERENCE TO RELATED APPLICATION

"Hybrid Circuit and Method," invented by David G. Messerschmitt, Ser. No. 098,622 filed Nov. 29, 1979, and assigned to the assignee of the present invention.

BACKGROUND OF THE INVENTION

The present invention relates to a speech detector for use in a hybrid circuit in a digital switching system.

As described more fully in the cross-referenced application entitled "Hybrid Circuit and Method," with the advent of digital switches for replacement of metallic cross-point analog switches in local telephone networks, there is a need for more accurate balancing of the hybrid circuit used for two-wire to four-wire conversion.

In such a hybrid circuit, in order to provide complete balancing between conversion of two-wire to four-wire, there is a need for a speech detector that can distinguish between a near end talker (NET) and a far end talker (FET) in the telephone system.

In such a circuit, it is desirable to provide continuous adaptation except when there is a near end speaker, no far end speaker, or both. There is a need therefore for a speech detector which can detect the presence of a near end talker and far end talker in a telephone system.

In view of the above background, the present invention achieves the objective of providing a speech detector for use in a hybrid circuit.

SUMMARY OF THE INVENTION

The present invention relates to a speech detector for use in an adaptive hybrid circuit.

The detector includes means for generating a first control signal representing the polarity or sign of the current flow component of the hybrid circuit and means for generating a second control signal representing the polarity or sign of the voltage component of the hybrid circuit.

The detector also includes means responsive to the first and second control signals for generating a third control signal representing the polarity or sign of the instantaneous power of the hybrid circuit and means responsive to the third control signal for generating a fourth control signal representing the presence or absence of a near end talker in the hybrid circuit.

In accordance with the above summary, the present invention achieves the objective of providing an improved speech detector and method for use in a hybrid circuit.

Other objects and features of the present invention will become apparent from the following detailed description when taken in conjunction with the accompanying drawings.

BRIEF DESCRIPTION OF THE DRAWINGS

FIG. 1 depicts a block diagram of a digital switching system utilizing hybrid circuits.

FIG. 2 depicts a more detailed diagram of a hybrid circuit.

FIG. 3 depicts an equivalent circuit for the hybrid circuit of FIG. 2.

FIG. 4 depicts a diagram of an improved hybrid circuit.

FIG. 5 depicts a block diagram of a speech detector circuit.

FIG. 6 depicts a more detailed diagram of the speech detector of FIG. 5.

FIG. 7 depicts an equivalent diagram of the diagram of FIG. 6.

FIG. 8 depicts a circuit diagram for the detector of FIG. 6.

DETAILED DESCRIPTION OF THE DRAWINGS

Referring now to FIG. 1, a digital switching system is illustrated in which a digital switch 10 is connected to hybrid circuits 12, 14. The four-wire section of the digital switching system is illustrated by buses 16-22, while the two-wire sections are illustrated by buses 24 and 26. The transmit port (TP) and receive port (RP) of hybrid circuit 12 are connected to digital switch 10 by buses 16 and 22, respectively. A speech waveform is transmitted to digital switch 10 via bus 16 and received at hybrid circuit 12 via bus 22. Similarly, hybrid circuit 14 is connected to digital switch 10 via buses 18 and 20 for the respective RP and TP ports.

As is known in the art, the function of a hybrid circuit is conversion of two-wire circuits such as buses 26 or 24 to four-wire circuits such as buses 16, 22, and 18, 20.

Referring now to FIG. 2, the hybrid function is illustrated in which the subscriber loop 38, with characteristic impedance $Z_L$, is coupled to digital switch 10 through transformer 36. The transformer winding on the switch side 10 has superimposed on it both the near end talker (NET) component y(t) as well as a filtered version of the far end talker (FET) component x(t). The cancelling filter $H(\omega)$ 32 is designed to emulate the transfer function from bus 30 to the transformer 36 and thus cancel the component of x(t) which would otherwise appear in the output of the hybrid function z(t) on bus 40. The 6 dB gain circuit 28 compensates for the loss between x(t) and transformer 36. The loss is nominally 6 dB since resistor 34 is the impedance presented to the loop by the hybrid and is generally 900 ohms, the nominal loop impedance.

Referring now to FIG. 3, an equivalent circuit for the hybrid of FIG. 2 is depicted where the signal y(t) on bus 50 represents the near end talker (NET) originating on the subscriber loop. An infinite transhybrid loss is achieved if $H(\omega)$ 46 is chosen to be equal to $H_L(\omega)$ 44, but $Z_L$ is not known precisely. Nevertheless, previous work has indicated that adequate singing margin is achieved if $H(\omega)$ is chosen to be $H_L(\omega)$ or $H_2(\omega)$, where $$H_j(\omega) = \frac{Z_j}{R + Z_j}, j = 1,2 \tag{1}$$

and $Z_1$ and $Z_2$ are two impedances chosen to match loaded and non-loaded loops. Let $$H(\omega) = \theta H_1(\omega) + (1-\theta)H_2(\omega) \tag{2}$$

where $\theta$ is a variable amplification factor chosen to be in the range $0 \leq \theta \leq 1$. When $\theta = 1$, $H(\omega) = H_1(\omega)$, and when $\theta = 0$, $H(\omega) = H_2(\omega)$. The proper choice of $\theta$ thus yields adquate singing margins, and the availability of values of $\theta$ between 0 and 1 yields an even better singing margin distribution. The resulting transhybrid transfer function is then $$H_{TH} = H_L(\omega) - \theta H_1(\omega) - (1-\theta) H_2(\omega) \quad [3]$$
$$= R \frac{(R+Z_1)(Z_L-Z_2) + \theta(R+Z_2)(Z_2-Z_1)}{(R+Z_L)(R+Z_1)(R+Z_2)}$$

In order to adjust the value of $\theta$ automatically, assume $x(t)$ and $y(t)$ are wide-sense stationary random processes. Defining the power in $z(t)$, which is a function of $\theta$, to be $P(\theta)$, $$P(\theta) = E[z^2(t)] \quad [4]$$

The criterion for the choice of $\theta$ is to minimize $P(\theta)$ or, in other words, to minimize the power of the far end talker (FET) appearing in $z(t)$. Since the NET power in $z(t)$ is not dependent on $\theta$, the NET has no influence on the resulting $\theta$. The resulting $\theta$ does depend on the spectral characteristics of $x(t)$. However, this dependence is not marked because of the severely limited degrees of freedom of the adaptive cancelling filter.

Recognizing the $P(\theta)$ is a quadratic function of $\theta$, $$P(\theta) = P(\theta_O) + K(\theta - \theta_0)^2 \quad [5]$$

where k is a constant which is a function of the spectrum of the input far end talker $x(t)$ and the unique minimizing $\theta$ is $\theta = \theta_0$; that is, $\theta_0$ is the optimal value by which the output signal $z(t)$ has a minimal FET power component. Defining $Q(\theta)$ to be $$Q(\theta) = \tfrac{1}{2} \frac{dP(\theta)}{d\theta} = K(\theta_0 - \theta) \quad [6]$$

by providing a circuit to estimate $Q(\theta)$, the appropriate adjustment of $\theta$ is to increase $\theta$ if $Q(\theta) > 0$ and decrease $\theta$ if $Q(\theta) < 0$. Substituting [4] into [6]

$$Q(\theta) = \tfrac{1}{2} \frac{d}{d\theta} E(z^2(t)) \quad [7]$$
$$= -E(z(t) \frac{dz(t)}{d\theta})$$
$$= E(z(t)w(t))$$

where $w(t)$ is the output of the filter with a transfer function $(H_1(\omega) - H_2(\omega))$ and input $x(t)$.

Referring now to FIG. 4, an adaptive cancelling filter according to the present invention is depicted in which the signal representing the far end talker $x(t)$ on bus 30 is connected to transfer filters H₁60 and H₂62. Filter 60 includes a resistor R and impedance $Z_1$ in order to match a loaded loop, as previously described. Similarly, filter 62 has resistance R and impedance $Z_2$ chosen to match a nonloaded loop.

The filtered signals from filters 60, 62 are connected to the plus (+) and minus (−) inputs, respectively, of circuit 64, thereby forming on bus 70 the $w(t)$ signal in accordance with equation [7], which is connected to first control circuit 66. As will be described, circuit 66 will disable adaptation when a control signal on bus 99 from the speech detector 98 of FIG. 5 is received by circuit 66.

The outputs of filters 60, 62 are also connected to a second control circuit 68, which also receives the $\theta$ signal on bus 67. Control circuit 68 generates an adaptive signal on bus 69 in accordance with equation [2].

The $x(t)$ signal on bus 30 (representing the far end talker is also connected together with the $y(t)$ signal (representing the near end talker) on bus 50 to the plus (+) input of circuit 74, which receives at its minus (−) input the adaptive output on bus 69 from control circuit 68 and thereby forms the $z(t)$ signal on bus 40, which is connected back to control circuit 66 and also forms the transmit output of the adaptive hybrid circuit. Further details of the hybrid circuit are described in more detail in the cross-referenced application entitled "Hybrid Circuit and Method."

FIG. 5 depicts a near end talker-far end talker (NET-FET) detector 98 which is connected to receive the $x(t)$ and $y(t)$ signals on buses 30, 50, respectively. Detector 98 can be utilized with the invention depicted in FIG. 4 when continuous adaptation is desired. Detector 98 determines when there is a near end speaker, no far end speaker, or both, and disables adaptation by generating a control signal on bus 99 for connection to control circuit 66 of FIG. 4. The need for a far end speaker for adaptation to proceed is evident, but the need to disable adaptation while there is a near end speaker is because:

1. A near end speaker will directly cause a larger variance in the estimate $Q(\theta)$ since it appears in $z(t)$, and
2. A delayed version of the near end speaker will appear in $x(t)$ due to the presumably finite far end hybrid return loss causing an error in estimate $Q(\theta)$.

Referring now to FIG. 6, a simplified version of the hybrid circuit of FIG. 5 is depicted. In FIG. 6, the power due to a far end talker (FET) will be flowing from left to right, and right to left for a near end talker (NET). The direction of power flow is detected by cross-correlating the differential voltage between the receive port (RP) and the line port (LP) (which is proportional to the current $i(t)$) with the voltage $v(t)$ in order to estimate the direction of average power flow. The average will be positive in the presence of a far end talker alone and negative in the presence of a near end talker alone. In the presence of double-talk, it will reflect the larger of the near and far end talkers.

In FIG. 6, the product $v(t)i(t)$ measures the instantaneous flux of power from or into the line port. For the indicated polarities, if the hybrid is delivering power to the line the product will be positive, and negative if the polarities are reversed. Average power can be estimated by accurate filtering and the result normalized with respect to the total power involved.

Both the hybrid and the line can be modeled by a Thevenin equivalent circuit as depicted in FIG. 7, represented by $x(t)$ and R for the hybrid and $y(t)$ and $Z_L$ for the line ($x(t)$ and $y(t)$ represent the far end and the near end talkers, respectively).

If:
$S_x$ = power density of the line port voltage due to $x(t)$
$S_y$ = power density of the line port voltage due to $y(t)$
$S_{ui}$ = cross power density of $v(t)$ and $i(t)$
Then:

$$S_{ui} = \frac{S_x}{Z_L} - \frac{S_y}{R}$$

The minus sign in the second term results from the polarity connection for $i(t)$ and $u(t)$ depicted in FIG. 7. The first term represents power to be delivered to the hybrid by the far end talker and the second represents the power delivered by the near end talker.

$$E[u(t)i(t)] = \tfrac{1}{2}\pi \int_{-\infty}^{\infty} S_{ui}\, d\omega$$

-continued $$= \tfrac{1}{2\pi} \int_{-\infty}^{\infty} \left( \frac{S_x}{Z_L} - \frac{S_y}{R} \right) d\omega$$

Considering the simple case of $Z_L = R_L = R$ $$E[u(t)i(t)] = \frac{1}{R}(\sigma_x^2 - \sigma_y^2) = \frac{\sigma_x^2}{R}\left(1 - \frac{\sigma_y^2}{\sigma_x^2}\right)$$

where $\sigma_x^2$ and $\sigma_y^2$ are the variances of the far end talker and the near end talker as measured in the line port. Normalization with respect to the power due to the far end talker ($\simeq \sigma_x^2/R$) yields a precise indication of the presence of the near end talker and even small values of $\sigma_y^2/\sigma_x^2$ can be detected.

Hard clipping u(t) and i(t) before forming the product leads to a transcendental function of $\sigma_y/\sigma_x$, which is still adequate and can be implemented easily in hardware. The hard clipping eliminates the necessity for normalization. Assuming all signals are Gaussian, $$S = E[\text{Sgn } u(t) \cdot \text{Sgn } i(t)] = \frac{2}{\pi} \sin^{-1}\left[\frac{E[u(t) \cdot i(t)]}{\sigma_u \cdot \sigma_i}\right]$$

and
$$\sigma_u^2 = \sigma_x^2 + \sigma_y^2$$

$$\sigma_i^2 = \frac{1}{2\pi} \int_{-\infty}^{\infty} \frac{S_x}{Z_L^2} + \frac{S_y}{R^2} d\omega$$

Considering again the simplest case of $Z_L = R_L = R$ $$S = \frac{2}{\pi} \sin^{-1}\left[\frac{1 - (\sigma_y^2/\sigma_x^2)}{1 + (\sigma_y^2/\sigma_x^2)}\right]$$

When $Z_L$ is complex, the output of the detector will be smaller than one even for the case of $\sigma_y = 0$, because of the reactive power involved. The minimum value of S evaluated for every expected signal and every possible line defines the maximum threshold that can be used for the final decision.

FIG. 8 depicts an implementation of the detector according to the present invention in which the voltage generated by current i(t) through resistor R is connected to comparator 120, which generates a signum function signal (±1) on bus 121. A signum function (abbreviated sgn (x)) is defined for all x different from 0 where sgn (x) > 1 if x = 0 and sgn (x) = −1 if x < 0.

In FIG. 8, the voltage v(t) is connected to comparator 122 which in turn generates the signum function of v(t) on bus 123.

The signum functions from comparators 120, 122 are exclusively ORed in gate 124, which generates on bus 125 a control signal representing the instantaneous sign of the power. The signal on bus 125 is connected to RC low pass filter 128, which removes the AC component of the instantaneous power signal by averaging and generates a control signal which represents the DC component of the instantaneous power. The DC component signal from filter 128 is compared with a reference signal in comparator 126 to determine the sign or polarity of DC component signal.

Experimental results using several voice signals and a line simulator give a maximum permissible threshold of 0.3 (normalized with respect to supply voltage), which enables the detection of the presence of a near end talker when it is 5 db below the far end talker, both measured in the line port.

The output of comparator 126 on bus 99 indicates a near end talker present by a logical "1" and the absence of a near end talker with a logical "0". This signal on bus 99 is connected to the hybrid circuit of FIG. 4 in order to disable adaptation when necessary.

What is claimed is:

1. In a hybrid circuit having a near end talker and a far end talker, a speech detector comprising means for generating a first control signal representing the polarity sign of the current flow component of the hybrid circuit, means for generating a second control signal representing the polarity sign of the voltage component of said hybrid circuit, means responsive to said first and second control signals for generating a third control signal representing the polarity sign of the power of said hybrid circuit, and means responsive to said third control signal for generating a fourth control signal representing the presence or absence of a near end talker in said hybrid circuit.

2. A speech detector as in claim 1 including comparator means for generating first and second signum function signals representing said first and said second control signals, respectively.

3. A detector as in claim 1 wherein said third means includes an exclusive-OR gate for generating said third control signal.

4. A detector as in claim 1 including filter means for generating a fifth control signal representing the DC component of said power and second comparator means responsive to said fifth control signal and to a predetermined reference signal for generating said fourth control signal.

5. A speech detector for use in a hybrid circuit having a near end talker and a far end talker, said speech detector comprising means for generating a first control signal representing the instantaneous sign of a current component of the power flow in said hybrid circuit, means for generating a second control signal representing the instantaneous sign of the voltage component of said power flow in said hybrid circuit, third means responsive to said first and second control signals for generating a third control signal representing the instantaneous sign of the power in said hybrid circuit, and fourth means responsive to said third control signal for generating a fourth control signal having a first state representing the presence of said near end talker in said hybrid circuit and having a second state representing the absence of said near end talker in said hybrid circuit.

6. In a hybrid circuit having a near end talker and a far end talker, a speech detector comprising means for generating a first control signal representing the instantaneous sign of the power flow in said hybrid circuit, and means responsive to said first control signal for generating a second control signal having a first state representing the presence of said near end talker in said hybrid circuit and having a second state representing the absence of said near end talker in said hybrid circuit.

7. In a hybrid circuit, the method of detecting the presence or absence of a near end talker in the hybrid circuit comprising the steps of generating a first control signal representing the instantaneous sign of the current component of the power flow in said hybrid circuit, generating a second control signal representing the instantaneous voltage component of said power flow in the hybrid circuit, generating a third control signal responsive to the first and second control signals representing the instantaneous sign of the power flow of the hybrid circuit and generating a fourth control signal responsive to said third signal having a first state representing the presence of a near end talker in the hybrid circuit and having a second state representing the absence of a near end talker in the hybrid circuit.

8. In a hybrid circuit, the method of detecting the presence or absence of a near end talker in the hybrid circuit comprising the steps of generating a first control signal representing the instantaneous sign of the power flow in said hybrid circuit, and generating a second control signal responsive to said first control signal having a first state representing the presence of a near end talker in the hybrid circuit and having a second state representing the absence of a near end talker in the hybrid circuit.

* * * * *